(12) United States Patent
Gunturu

(10) Patent No.: US 7,370,100 B1
(45) Date of Patent: May 6, 2008

(54) METHOD AND APPARATUS FOR LOAD BALANCING BASED ON PACKET HEADER CONTENT

(75) Inventor: Anilkumar Gunturu, Santa Clara, CA (US)

(73) Assignee: Foundry Networks, Inc., Santa Clara, CA (US)

( * ) Notice: Subject to any disclaimer, the term of this patent is extended or adjusted under 35 U.S.C. 154(b) by 805 days.

(21) Appl. No.: 10/731,972

(22) Filed: Dec. 10, 2003

(51) Int. Cl.
*G06F 15/173* (2006.01)

(52) U.S. Cl. .................. 709/223; 709/220; 709/225; 703/2

(58) Field of Classification Search ............... 709/223, 709/225, 246, 242, 220, 227; 703/2
See application file for complete search history.

(56) References Cited

U.S. PATENT DOCUMENTS

| | | | |
|---|---|---|---|
| 5,941,947 A * | 8/1999 | Brown et al. .............. 709/225 |
| 6,381,602 B1 * | 4/2002 | Shoroff et al. .............. 707/9 |
| 6,651,096 B1 * | 11/2003 | Gai et al. .................. 709/223 |
| 2002/0143614 A1 | 10/2002 | MacLean et al. |
| 2004/0024861 A1 | 2/2004 | Coughlin |
| 2004/0054569 A1 | 3/2004 | Pombo et al. |
| 2004/0078105 A1 | 4/2004 | Moon et al. |
| 2004/0088349 A1 | 5/2004 | Beck et al. |
| 2005/0049924 A1 | 3/2005 | DeBettencourt et al. |
| 2005/0060372 A1 | 3/2005 | DeBettencourt et al. |
| 2007/0118339 A1 * | 5/2007 | Moon .......................... 703/2 |

OTHER PUBLICATIONS

Gunturu, "Method and Apparatus for Load Balancing Based on XML Content in a Packet," U.S. Appl. No. 10/731,979, filed Dec. 10, 2003.

* cited by examiner

*Primary Examiner*—Khanh Dinh
(74) *Attorney, Agent, or Firm*—Seed IP Law Group PLLC

(57) ABSTRACT

A technique to load balance network packet traffic using content switching is provided. Packets are routed to a particular server or otherwise processed based on the HTTP header content of the packets. In an embodiment, the HTTP header contents of the packets are used in such processing. Content switching decisions are based on any field in the HTTP header, including both known and unknown fields. A plurality of content switching policies is provided. A policy includes a set of rules and actions associated with these rules. Complex nested rules are defined. The evaluation of these nested rules is simplified by converting the nested rules in to their sum of products or minterm representations, and then a bit mask technique is used in conjunction with the minterm representations to determine which set of complex rules in a policy is valid and thus require the corresponding content switching action.

40 Claims, 4 Drawing Sheets

METHOD AND APPARATUS FOR LOAD BALANCING BASED ON PACKET HEADER CONTENT

TECHNICAL FIELD

This disclosure relates generally to communication of packets within a network. More particularly but not exclusively, the present disclosure relates to techniques for making load balancing decisions based on packet header content, such as hypertext transfer protocol (HTTP) header content, and for creating and evaluating logical rules to make such load balancing decisions.

BACKGROUND INFORMATION

The most basic unit of data transmission in Transmission Control Protocol/Internet Protocol (TCP/IP) or Internet networking is a packet (sometimes referred to as a "datagram"). A packet is a small piece of information coded at a source, marked with the source address (SA), and directed to a destination address (DA). The SA and DA are typically placed in a header of the packet, while data is placed in a payload of the packet. Traditional IP networks and systems rely exclusively on IP addressing to route the packet from one IP network to another, until arriving at the destination address specified in the packet. Routers, switches (such as Ethernet switches), hubs, or other network devices operate to forward packets to their ultimate destination.

A packet can have several headers. For instance, a packet can have a Layer 2 header and a Layer 2 payload. The Layer 2 payload in turn can include a Layer 3 header and a Layer 3 payload. The Layer 3 payload can in turn include a Layer 4 header and a Layer 4 payload, and so on. The Layer 4 payload includes an HTTP header and the HTTP payload. Within the HTTP header, there are several fields whose contents are defined by Request for Comments (RFC) standards. Examples include HTTP header fields having information present in hostname, uniform resource locator (URL), and cookie fields.

For purposes of load balancing network traffic, packets are routed among different servers to ensure that one server does not service all incoming client requests. One technique to load balance is based on the content present in the RFC-defined hostname, URL, and cookie fields of an HTTP header. For example, a packet can be routed to a particular server on the basis of a hostname or host identification (ID) specified in the destination hostname field. As another example, a packet can be directed to a particular server based on a prefix, suffix, or pattern in a URL string of a GET request. As yet another example, cookie switching allows load balancing based on a cookie value, where the cookie value is present as a name value pair in the HTTP header. Accordingly, since the content of these HTTP fields are used for load balancing decisions, this type of routing of packets can be viewed as involving "content switching."

While use of the information in these three fields does provide load balancing capability, such use is rather primitive and limited in functionality. For instance, the syntax of these rules can be likened to a simple "if-then" statement (e.g., "if the hostname=X, then route the packet to server 1"). The simple structure and primitive evaluation process of these rules is inadequate for use in more complex load balancing scenarios.

BRIEF SUMMARY OF THE INVENTION

One aspect of the present invention provides a method that includes defining a plurality of first rules made up of relatively less complex second rules. The method includes defining a policy having at least some of the plurality of first rules and defining corresponding actions to undertake that are related to communication of a packet within a network. The first rules are converted into minterm representations. A bit mask is generated for each of the second rules based on their presence in the minterm representations. The method uses the generated bit masks and content in a header of the packet to evaluate the plurality of first rules in the policy and to determine a corresponding action to undertake.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various views unless otherwise specified.

DETAILED DESCRIPTION

Embodiments of techniques to load balance based on packet header content by using and evaluating logical rules are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment provides a technique to load balance using content switching. Packets can be routed to a particular server or otherwise processed based on the header content of the packets. In an embodiment, the HTTP header contents of the packets are used in such processing. Rather than making load balancing decisions based solely on the hostname, URL, or cookie fields in the HTTP header, the embodiment can support content switching decisions based on any field in the HTTP header, including both known and unknown fields.

According to one embodiment, a plurality of content switching policies is provided. A policy comprises a set of rules and actions associated with these rules. Each rule in turn can comprise a simple rule, a rule based on a method type, a nested rule including multiple simple rules, and other rules based on content of fields in the HTTP header. Various embodiments provide example syntax to define these rules. With regards to nested rules, such rules can be complex rules since they contain multiple rules to evaluate. Accordingly, one embodiment simplifies the evaluation of these nested rules by converting the nested rules in to their sum of products or minterm representations, and uses a bit mask technique in conjunction with the minterm representations to determine which nested rules are valid.

Figure 1:
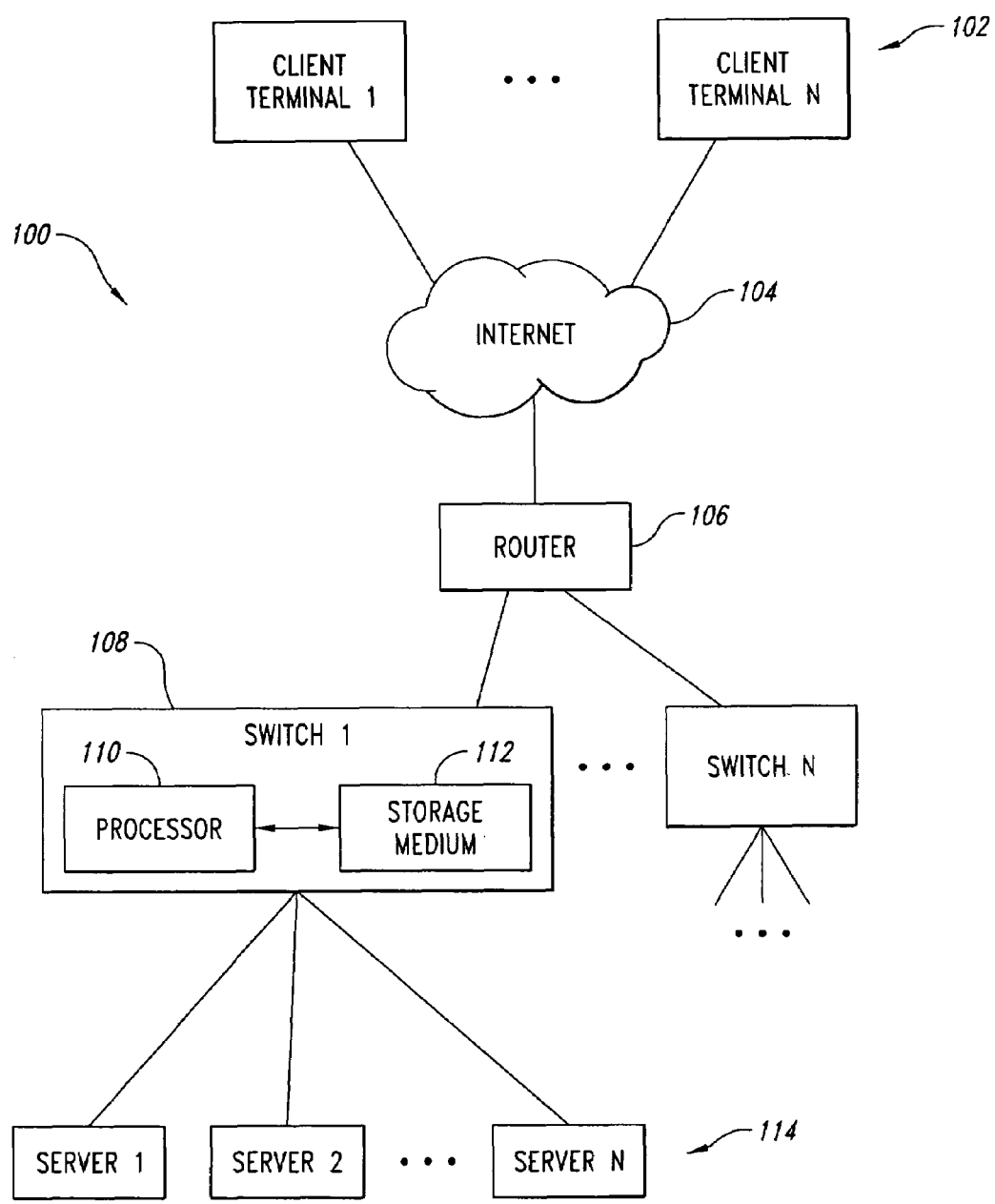
FIG. 1 is a block diagram of an example system in which one embodiment may be implemented.

FIG. 1 is a block diagram of an example system 100 in which one embodiment may be implemented. For the sake of simplicity and brevity, not all of the possible components that may be present in the system 100 are shown in FIG. 1 or described in detail herein. Only certain components that are helpful in understanding operation of an embodiment are shown and described.

The system 100 includes a plurality of client terminals 102 that are communicatively coupled to a network 104. The network 104 is illustrated in FIG. 1 as an Internet, and it is appreciated that other embodiments can be implemented in conjunction with other types of networks, such as local area networks (LANs), virtual private networks (VPNs), and the like.

One or more routers 106 are coupled to the network 104. Each router is in turn coupled to one or more switches 108. An example of a switch 108 with which an embodiment may be implemented is the ServerIron® product available from Foundry Networks, Inc. of San Jose, Calif. The switch 108 includes one or more processors 110, and one or machine-readable storage media 112. In an embodiment, the storage medium 112 can store software, code, or other machine-readable instructions executable by the processor 110, wherein such machine-readable instructions are used in connection with performing load balancing decisions based on packet header content. In one embodiment, the storage medium 112 stores code that defines rules and load balancing actions to be undertaken based on the rules, including code that executes an algorithm to evaluate the rules and to perform actions based on results of the evaluation of the rules. Additionally, the storage medium 112 can store data (such as in databases, look-up tables, files, or other data structure) that is used in connection with performing the load balancing algorithms and decisions.

Each of the switches 108 is coupled to a plurality of servers 114. The servers 114 can form part of a server cluster, or can be identified by group identifications (IDs), in some implementations. The servers 114 can provide access to applications, web sites, files and data, or other resources requested by the client terminals 102. A URL, destination address, port number, IP address, hostname, domain name, or other suitable identification mechanism can identify these resources and/or the servers 114. Based on load balancing decisions and other criteria, the switch 108 can decide which particular server 114 to route a request sent from a client terminal 102.

In one embodiment, the communication between the various components in the system 100 can be performed using packet-based or packet-switching communication techniques. Example protocols are TCP/IP and HTTP, and it is appreciated that some embodiments may be implemented in systems 100 that can use other types of protocols (or combinations thereof).

Figure 2:
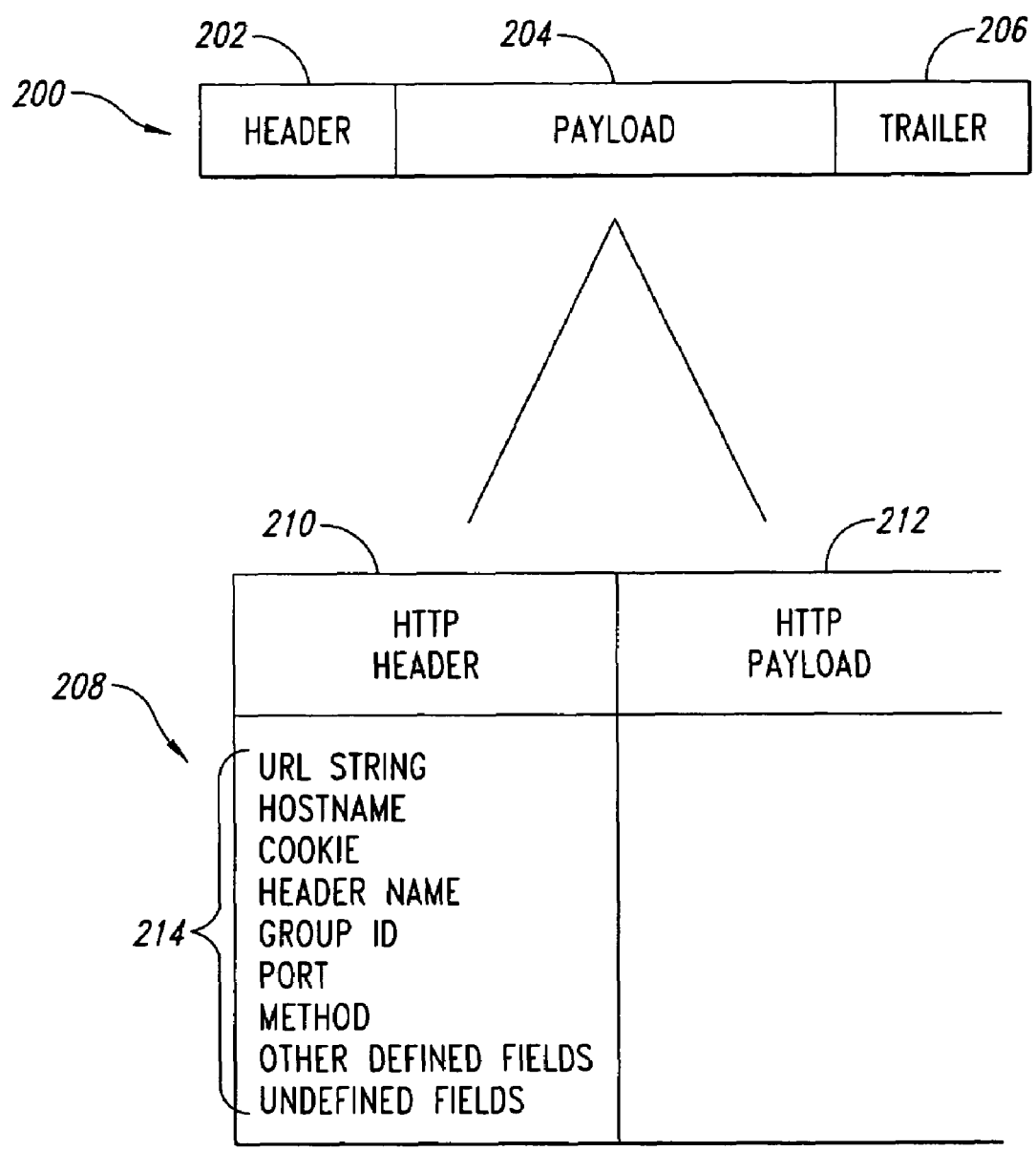
FIG. 2 is a diagrammatic illustration of a packet that can be evaluated by one embodiment.

FIG. 2 is a diagrammatic illustration of a packet 200, such as a TCP packet, that can be evaluated by one embodiment when making content-based load balancing decisions. The packet 200 includes a header 202, a payload 204, and a trailer 206. The payload 204 can in turn include additional layers headers and payloads. For instance, a Layer 2 payload can contain the Layer 3 header and payload, the Layer 3 payload can contain the Layer 4 header and payload, and so on.

One of these embedded layers corresponds to an application layer that contains an HTTP packet 208 having an HTTP header 210 and an HTTP payload 212. The HTTP header 210 includes a plurality of fields 214 containing certain pieces of information. For example, some of the fields 214 include a field having a URL string (of a destination for the packet 208), a field having a hostname associated with the destination, and a cookie field. There may be other fields that contain information associated with a server group ID, a destination port, method, control information, and the like. Other fields (and their contents) in the HTTP header 210 may be defined or undefined. The defined fields can be fields whose contents are defined by standards or protocols. The undefined fields have no specific requirement as to their contents or formats, and are generally available for insertion of any type of information deemed useful by users.

According to an embodiment, decisions as to a particular action to perform on a packet (such as where to forward, whether to drop, persist, redirect, and the like) can be based on information contained in any of the fields 214. Thus, rather than making a load balancing decision (with regards to which server 114 to route a packet) based solely on information contained in just one of the URL, hostname, and cookie fields, an embodiment performs load balancing decisions based on content of any one of the fields 214. These load balancing decisions are not necessarily restricted to content of just one field, but may be based on contents of any multiple and combination of fields, as will be explained in further detail below.

According to an embodiment, a plurality of content switching (CSW) policies is provided. A CSW policy comprises a set of rules and actions associated with these rules. A CSW policy can have an example command line interface (CLI) syntax of:

csw-policy <policy-name>: match <rule-name><action> [<action-target>], wherein <policy-name> is the name of the particular CSW policy, <rule-name> is the rule being evaluated in the CSW policy, <action> is the action to be taken if the rule is true or matches, and <action-target> is the identification of a destination to which the action is to be applied. The table below lists possible values of <action>, the corresponding possible <action-target> definitions, a description of the action and/or target definition, and corresponding example CSW policies.

| Action | Target Definition | Description | Examples |
| --- | --- | --- | --- |
| Forward | <server-id/group-id> | Forwards the packet to the group-id specified in the action target. | match ruleA forward 1 |
| Persist | <offset> <length> <type> | Persist action type is valid for header-name rule type.<br>Offset - Offset of the content to be persisted on<br>Length - Length of the content to be persisted on<br>Type - Persistence type. This can be group-server-id, hashing or server-name.<br>group-server-id: packets are sent to the group-server-id specified at the offset.<br>server-name: packets are sent to the server-name specified at the offset.<br>Hashing: packets with the same hash content specified at the offset are sent to the same server. | match ruleD persist 10 20 group-server-id<br>* group-server-id is in the 20 bytes located at the offset 10 from the header-name specified in ruleD.<br>match ruleD persist 10 20 server-name<br>server-name is in the 20 bytes located at the offset 10 from the header-name specified in ruleD.<br>match ruleD persist 1020 hashing |
| Redirect | <new-domain> [<new-url>] | Redirects the packet to the specified domain-name. Optionally one can specify the new-url also. | match ruleB redirect "foo.com" |
| Reply-error | — | Sends an error page to the client | match ruleE reply-error |
| Reset-client | — | Send a reset to the client | match ruleD reset-client |

To briefly describe some of the entries in the table above, the CSW policy "match ruleA forward 1" in the first table row states that if there is a match of ruleA, then forward the packet to the servers having a group ID of 1. The CSW policy "match ruleB redirect 'foo.com'" in the third table row states that if there is a match of ruleB, then redirect the packet to the domain "foo.com." The other example CSW policies, actions, and target definitions are self-explanatory from the table above, and therefore, for the sake of brevity, will not be described in further detail.

The above table and examples provided <rule-name> examples of "ruleA," "ruleB," etc. An example CLI syntax to define any particular rule is:

Rule: rule-name rule-type <rule-data>, wherein the "rule-type" specifies the type of rule involved with that particular <rule-name>, and <rule-data> specifies the fields of an HTTP packet (or other location of the packet) that has data to be evaluated by the rule. Example rule types are nested rule, method, URL, version, header, header-name, XML tag, and other suitable rule types.

The table below provides more details for the rule types, syntax for <rule-data>, description of the rule type, and examples according to an embodiment.

| Rule-Type | Rule-Data Syntax | Description | Examples |
| --- | --- | --- | --- |
| Method | <eq \| ne> <method-string> | This type of rule is used for content switching based on the method type in the http header. The two operators supported are eq (equals) and ne (not equals) to test the equality of the method string.<br>Method strings can be one of the following: OPTIONS\|GET\|HEAD\|POST\|PUT\|DELETE\|TRACE\|CONNECT | csw-rule ruleA method eq GET |
| Nested-rule | <rule-string> | Nested rules are used for defining complex rules with logical operators. The syntax for representing these rules is shown below:<br>expr     -> expr & term<br>           -> expr \| term<br>           -> term<br>term     -> !factor<br>           -> factor<br>factor   -> (expr)<br>           -> ruleId<br>In the above example:<br>ruleId—name of the simple rule. Nesting of complex rules is not allowed in one embodiment.<br>&—logical "and"<br>\|—logical "or"<br>!—logical "complement" | csw-rule ruleB "X&(Y\|Z\|(!W))"<br>W, X, Y, Z represent simple rules. |
| url | <prefix\|suffix\|pattern> <type-value-string> | This type of rule uses the url in the http header to make content switching decision. The following three operators are supported | csw-rule ruleC prefix "/home" |

-continued

| Rule-Type | Rule-Data Syntax | Description | Examples |
|---|---|---|---|
| | | Prefix—looks for the longest prefix specified by the type-value-string. Suffix—looks for the longest suffix specified by the type-value-string. Pattern—looks for the pattern specified by the type-value-string. | |
| Header-name | <header-name> exists | This type of rule is used for determining whether a given header name exists in the http headers. Only this type of rule can accept the persist rule action in one embodiment. | csw-rule ruleF header-name "Language" exists. |
| Header | <header-name> <equals\|prefix\|suffix\|pattern> <header-value> | This type of rule is used for switching based on the value of the http headers. For example, it is possible to switch based on the host name in the http header. | csw-rule ruleG header "host" prefix "www.yahoo" |
| xml-tag | <tag-name> <prefix\|suffix\|pattern> <tag-value> | Content switching decision is based on the xml-tag present in the packet. | csw-rule ruleH xml-tag "tag1" prefix "test" |

To briefly describe some of the entries in the table above, the first table row defines ruleA based on the method type specified in the HTTP header. Thus in the example, ruleA is defined for packets where the method in the HTTP header is equal to (or contains) a GET string.

The second table row specifies that nested rules are used for defining complex rules (e.g., ruleB). The complex rules are made up of simple rules (e.g., W, X, Y, Z) that strung together through logical operators. The third table row applies the rule to the URL specified in the HTTP header. The URL may be examined with respect to the prefix, suffix, or other pattern in the URL string.

The fourth table row defines a rule in terms of whether a given header name exists in the HTTP header. The fifth table row defines a rule based on the content of the HTTP header, which can include a header name, a string (such as prefix, suffix, or pattern), or a header value. For example, the rule might be applied to a packet having a string or host prefix of "www.yahoo."

The sixth table row involves a rule wherein content switching is based on the extensible markup language (XML) tag present in the packet. XML information may be present in the packet in a location different from the HTTP header. An embodiment of a technique to use content switching based on XML content in a packet is disclosed in U.S. patent application Ser. No. 10/731,979, entitled "METHOD AND APPARATUS FOR LOAD BALANCING BASED ON XML CONTENT IN A PACKET," filed concurrently herewith, with inventor Anilkumar Gunturu, assigned to the same assignee as the present application, and incorporated herein by reference in its entirety.

With regards to nested rules, multiple rules can be combined to define a single rule, using parenthesis and logical operators in an embodiment. The table below explains these logical operators and their use within an expression of a nested rule:

```
csw-rule "rule-name" nested-rule expr
         The syntax of expr is discussed below
-----------------------------------------------------------------------
left associative grammar
NOT(!) has higher precedence than AND (&) and OR (|)
-----------------------------------------------------------------------
expr    -> expr && term
        -> expr || term
        -> term
```

-continued

```
term    -> !factor
        -> factor
factor  -> (expr)
        -> rule-id (rule-id is a predefined rule)
Example:
csw-rule: "n_rule" nested-rule "(!ruleA || ruleB) && (ruleC || ruleD)"
ruleA, ruleB, ruleC, ruleD can be either simple rule or multiple rules.
```

The table below provides an illustration of the manner in which simple rules may be individually defined or configured at the switches 108 with CLI command, and then combined into complex (nested) rules. An example policy (policy A) that defines content switching actions based on the results of the evaluation of the rules is also provided below.

```
csw-rule r_url_prefix_1 url prefix "/home"
csw-rule r_url_prefix_2 url prefix "/news"
csw-rule r_url_suffix_1 url suffix ".html"
csw-rule r_url_suffix_2 url suffix ".gif"
csw-rule r_url_pattern_1 url pattern "cnn"
csw-rule r_url_pattern_2 url pattern "cbs"
csw-rule r_url_host_1 header hostname EQ "cnn.com"
csw-rule r_url_host_2 header hostname EQ "cbs.com"
csw-rule r_cookie_1 header cookie-name EQ "cookie1"
csw-rule r_cookie_1 header cookie-name EQ "cookie1"
csw-nested-rule ruleA (r_url_prefix_1 AND r_cookie_2) OR
r_url_pattern_1
csw-nested-rule ruleB (r_url_host_1 AND r_cookie_2)
OR r_url_pattern_1
csw-nested-rule ruleC (r_url_prefix_1 AND r_suffix_2) OR
r_url_pattern_1
csw-policy policyA
match rule ruleA forward 1
match rule ruleB reply-error
match rule ruleC reset-client
default 5
```

In the above example, the simple rules are defined with regards to content of the URL string (prefix, suffix, and pattern) specified in the HTTP header. Other simple rules are defined with regards to values in the hostname and cookie specified in the HTTP header. Complex nested rules A, B, and C are in turn defined using these simple rules that are expressed using logical operators and parentheses. Finally, the policy A is defined, which specifies the particular action for the switch 108 to undertake based on whether there is a match of any one of the nested rules A, B, or C.

Figure 3:
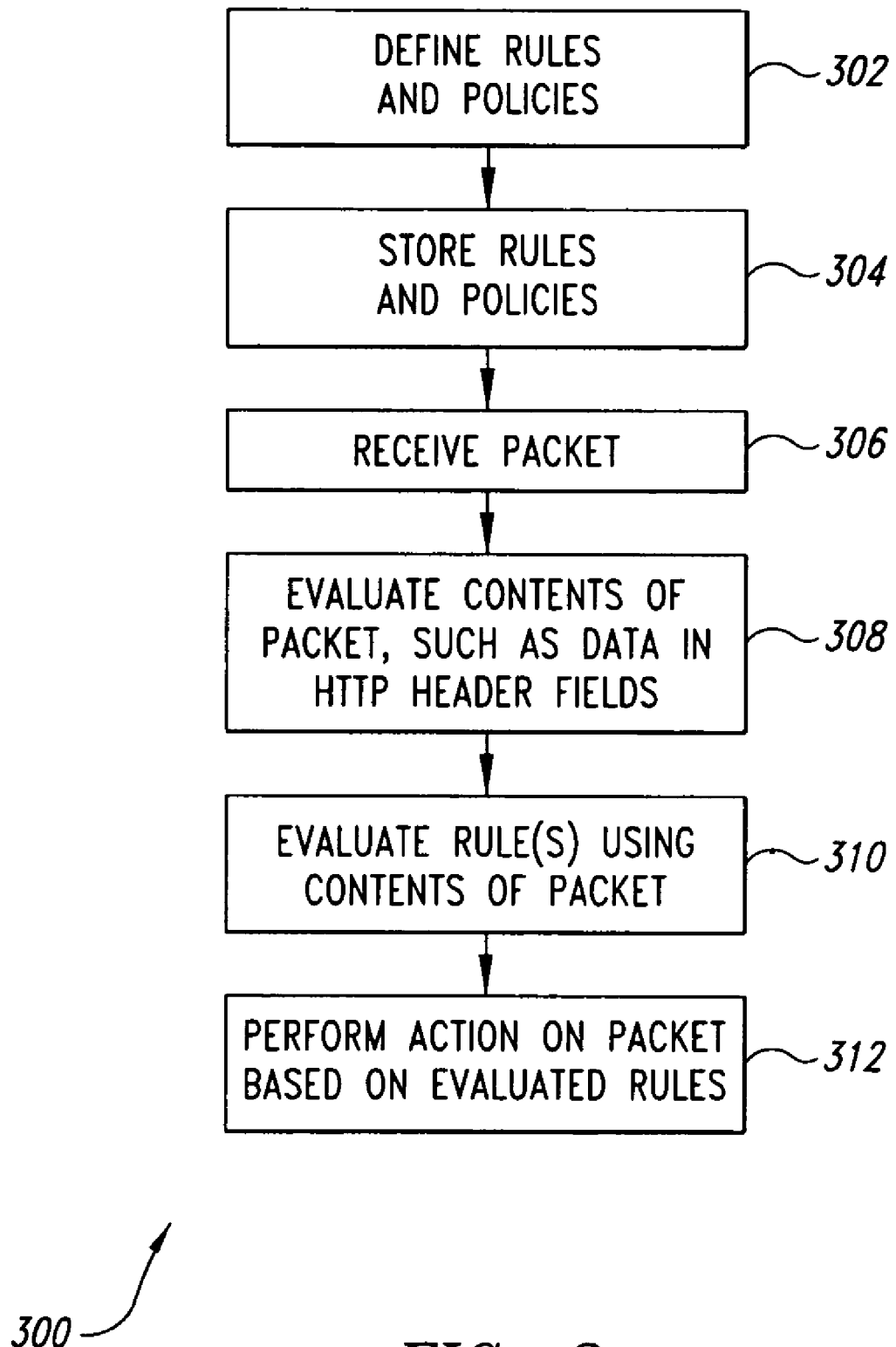
FIG. 3 is a flowchart of a technique to use complex rules to evaluate contents of a packet in connection with content switching according to an embodiment.

FIG. 3 is a flowchart 300 of a technique to use complex rules to evaluate contents of a packet in connection with content switching according to an embodiment. Elements of the flowchart 300 (and other flowcharts depicted herein) may be embodied in software, code, or other machine-readable instruction stored on a machine-readable medium. For example, operations represented by the flowchart 300 may be embodied in software stored at the storage medium 112, which can be executed by the processor 110. It is appreciated that the operations depicted in the flowcharts need not necessarily occur in the exact order shown, and that various operations may be added, removed, modified, or combined.

At a block 302, a plurality of both simple and complex rules is defined. These complex and simple rules may be defined using the techniques illustrated and described with respect to the tables shown above, such as via use of logical operators, parentheses, rule types, and so forth. For load balancing purposes, the rules and policies may be defined in a manner that packet traffic to the servers 114 can be optimally distributed. At the block 302, the CSW policies may also be defined to specify the actions to be taken given one or more rules that are satisfied.

In an embodiment, the rules and policies may be generated via CLI commands programmed into the storage medium 112 or otherwise stored at a block 304. Any suitable technique may be used to store the rules and policies at the block 304, including but not limited to, storage in databases, file systems, lookup tables, or other data structure. The rules and policies may also be stored as static or dynamic code. For the sake of simplicity of explanation, the rules and policies will be described hereinafter in terms of being stored in a database format, and it is appreciated that the invention is not limited to databases.

At a block 306, a packet sent from one of the clients 102 is received at the switch 108 (or at some other network location that has the capability to perform content switching). At this point, the switch 108 needs to evaluate the contents of the packet and determine which server 114 to route the packet (or to perform some other action).

For example at a block 308, the switch 108 can evaluate the contents of the packet by reading the data in its HTTP header fields. Various techniques may be used to read the data in the HTTP header fields. In one embodiment, all fields can be read in sequence. In another embodiment, only certain fields are read and may further be read in some specific order.

Using the contents of the HTTP header (or other portions of the received packet), the applicable rules are evaluated at a block 310. For example, if the HTTP header includes a GET method string and if a URL string of "foo.com" is present in the HTTP header, then a particular complex rule is evaluated using results of simple rules that are defined using contents of method and URL fields in an HTTP header. More detailed descriptions of techniques for evaluating rules at the block 310 are provided later with respect to FIG. 4 and accompanying tables.

At a block 312, one or more actions are performed on the packet based on the evaluated rules, in accordance with the applicable CSW policy. For example, the packet may be forwarded to a particular server or redirected. Other actions include persist, error message, reset, and the like.

As described above with reference to the block 310, the switch 108 determines the action to be performed on an incoming packet after inspecting contents of the incoming packet. The packet inspection process involves matching the contents to the rules defined in a policy database.

Since, the rules in the policy database may differ widely (e.g., host header rules and URL rules) and the nested nature of the rules (e.g., ruleC=ruleA AND ruleB), an efficient searching strategy is used by an embodiment for the evaluation of rules. An implementation that evaluates one rule after another might not be sufficiently scalable in some instances. For example, consider the following CSW policy configuration:

if(($rule_1$ and $rule_2$) or $rule_A$)
{
forward 1;
}
else if ($rule_3$ or $rule_4$)
{
forward 2;
}
.
.
.
else ($rule_{n-1}$ and $rule_n$)
{
forward n;
}

If n becomes large, evaluating the rules using the above logic will become inefficient. An embodiment of an evaluation algorithm avoids this sequential rule analysis by using bit masks that are calculated during the configuration time.

Before the details of such an algorithm that handles multiple headers and nested rules are described, a first embodiment of a packet-scanning method for CSW policies comprising rules that belong to only one HTTP header and simple rules is first discussed. In this first embodiment for instance, URL switching makes the load balancing decisions based on the URL field in the HTTP header. A typical example is described below:

if(url has a prefix "$a_1b_1c_1$")
{
forward 1
}
else if(url has a prefix "$a_2b_2c_2$")
{
forward 2
}
.
.
.
else if(url has a prefix "$a_nb_nc_n$")
{
forward n
}

Such rules are not evaluated one after the other in this first embodiment. Instead, all the patterns ("$a_1b_1c_1$", "$a_2b_2c_2$", . . . , "$a_nb_nc_n$") are stored in a data structure, and the input text from the HTTP header is scanned only once to determine the matching action. This URL switching technique uses finite automaton and trie data structures, for example.

However, as content switching is extended for more than one HTTP header and nested rules, the scheme of this first embodiment becomes less efficient. Consider the following example in which "&" represents AND, "|" represents OR, and "!" represents NOT:

if((url has a prefix "$a_1b_1c_1$") & (host has a pattern "$x_1y_1z_1$"))
{
forward 1

```
}
else if((url has a prefix "a₂b₂c₂") | (cookie has a prefix
    "x₂y₂z₂"))
{
  forward 2
}
.
.
.
else if(((url has a prefix "aₙbₙcₙ") & !(host has a prefix
    "xₙyₙzₙ"))| (cookie has a prefix "x₂y₂z₂"))
{
  forward n
}
```

Note that in this example, there are multiple operators AND, OR, and NOT, and there is also the presence of different headers url, cookie, and host. This policy may be evaluated sequentially one rule after another, and/or each specific simple rule and complex rule may be evaluated in accordance with the first embodiment. However, such techniques contain multiple rule evaluation steps, which require increased processing capacity, and which therefore may increase latency and delay in the processing (e.g., forwarding) of packets.

Figure 4:
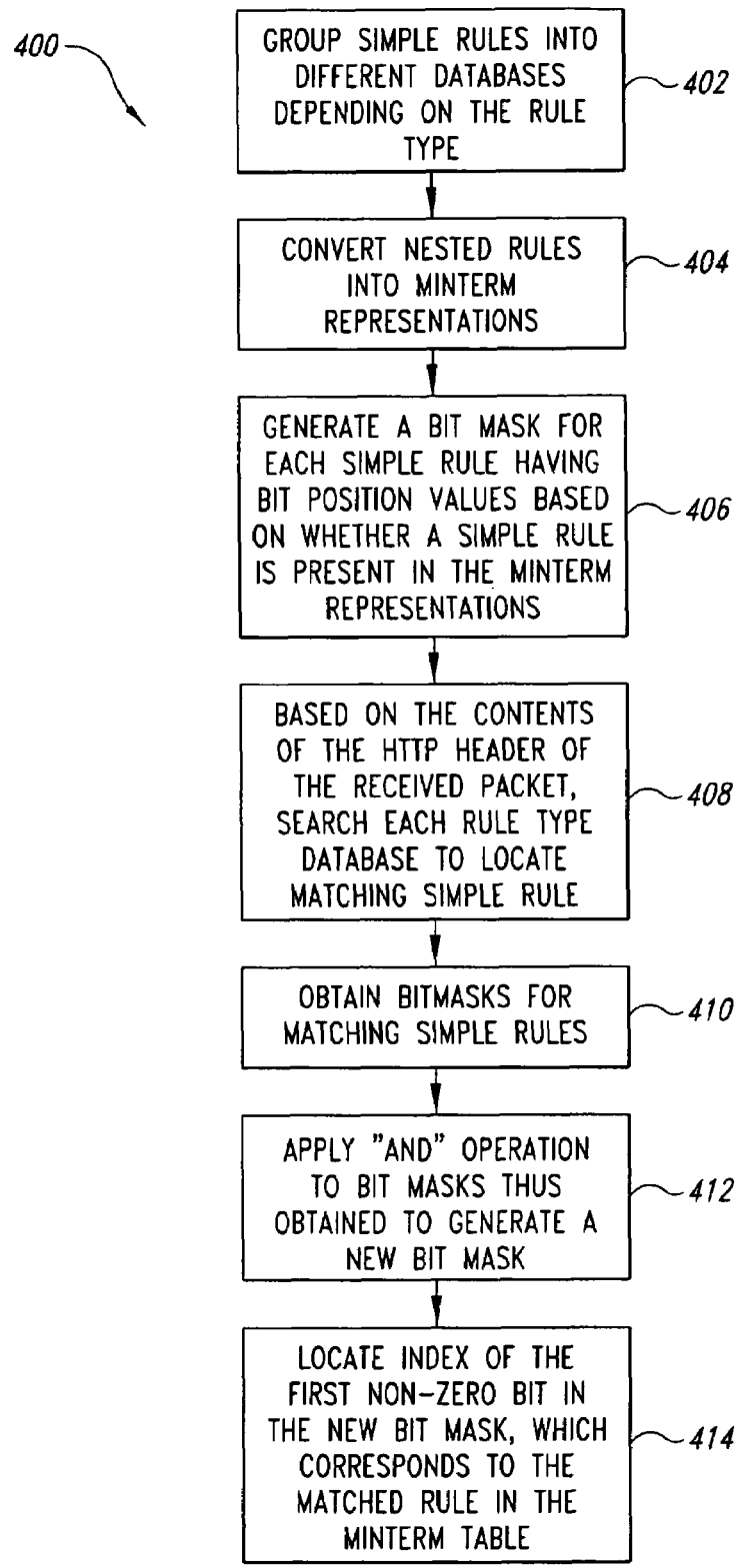
FIG. 4 is a flowchart of an embodiment of a technique to evaluate content switching policies having complex rules.

Accordingly, an embodiment provides a more efficient technique for evaluating complex rules and policies. A flowchart 400 of FIG. 4 depicts an embodiment of the technique from the block 310 of FIG. 3 to evaluate CSW policies having complex rules. At a block 402, simple rules are grouped into different databases depending on the rule type. That is, rules of the same type for string comparisons are placed in the same database. For example, all the rules that operate on hostname values are grouped into one database, and all the rules that operate on cookie values are grouped into a different database. Each of these databases can be later evaluated/searched (in a block 408 below) by scanning the packet contents only once, similar to the method used by URL switching technology described earlier, and then searching for matches in each database. Fast pattern matching algorithms, finite automaton, and dynamic prefix trie are some example techniques that can be used to search the databases.

At a block 404, conversion of nested rules into their sum of products or "minterm" representation is performed. In this minterm form, a nested rule is broken down into a set of minterms summed together. Although the nested rule may have both "&" and "|" operators, each minterm will have only the "&" operator. For example if $r_n$ is a nested rule, and $r_a$, $r_b$, and $r_c$ are simple rules satisfying the relation $r_n = (r_a | r_b)$ & $r_c$, the nested rule $r_n$ can also be represented as $r_n = (r_a$ & $r_c) | (r_b$ & $r_c)$. The minterms of the nested rule $r_n$ are thus $(r_a$ & $r_c)$ and $(r_b$ & $r_c)$. These minterms may be placed in a minterm table or other suitable data structure.

Since minterms have only the "&" operator, if any of the rules in the minterm is false, the entire minterm is false. This property and the finite automaton searching strategy described earlier, coupled with the bit mask scheme, described later are used to efficiently evaluate the CSW policy. By converting a complex rule into a set of minterms, simpler AND operations can be performed, thereby resulting in a reduction of the processing requirements and operations to evaluate the complex rule.

It is noted that the operations depicted in the blocks 402-404 and in a subsequent block 406 need not necessarily occur at the block 310 of FIG. 3. The configuration performed during these blocks may be performed at the blocks 302-304 of FIG. 3, for example.

During the configuration, a bit mask is generated for every rule in each rule type database. The bit length of the bit mask is equal to the total number n of minterms. If $n^{th}$ bit in the bit mask is binary 0, then the $n^{th}$ minterm is false—this means that if a particular simple rule is not present in that minterm, that simple rule has a "false" value in that minterm, which makes the entire minterm false. For all the minterms in which the given simple rule is present, the corresponding bit in the bit mask is set to binary 1 or otherwise enabled. All other bits are set to zero or otherwise disabled, unless the corresponding minterm does not have any rules that belong to the same rule type database, in which case the corresponding bit positions are enabled.

When the packet arrives, its header contents are matched with each of these databases at a block 408. Each database search matches one simple rule. For example, the host field in the HTTP header may specify a particular host pattern or string. The host field database is searched for the specific simple rule that matches that host pattern. As another example, for a URL prefix specified in the HTTP header, the URL database is searched to locate a simple rule that matches that URL prefix. This process is repeated at the block 408 for the other contents of the HTTP header, to locate matching simple rules.

At a block 410, the previously generated bit masks corresponding to the matching simple rules from the block 408 are obtained. At a block 412, an AND operation is applied to these obtained bit masks to generate a new bit mask. The first bit index in the new bit mask whose value is binary 1 (i.e., non-zero) is located at a block 414 and represents the index of the matched rule from the minterm table. This matched rule from the minterm table corresponds to a set of rules in the policy that is valid, and therefore the corresponding defined action needs to be undertaken by the switch 108.

To further illustrate the operations depicted in the flowchart 300 of FIG. 3 and in the flowchart 400 of FIG. 4, the following example is provided:

A. Block 402: The following rule type databases are loaded with definitions for a plurality of simple rules $R_{u1-3}$, $R_{h1-2}$, and $R_{c1-2}$.

URL Rules
$R_{u1}$=url has a prefix "$a_1b_1c_1$"
$R_{u2}$=url has a prefix "$a_2b_2c_2$"
$R_{u3}$=url has a prefix "$a_3b_3c_3$"
Host Rules
$R_{h1}$=host has a pattern "$x_1y_1z_1$"
$R_{h2}$=host has a pattern "$x_2y_2z_2$"
Cookie Rules
$R_{c1}$=cookie has a pattern "$e_1f_1g_1$"
$R_{c2}$=cookie has a pattern "$e_2f_2g_2$"

B. Blocks 302-304: The following nested rules and policy are defined.

Nested Rules
$R_{n1}=(R_{u1}$ & $R_{h1})$
$R_{n2}=(R_{u2}$ & $R_{c1})$
$R_{n3}=(R_{u3} | R_{h2})$ & $R_{c2}$
Policy
Match $R_{n1}$ forward 1
Match $R_{n2}$ forward 2
Match $R_{n3}$ forward 3

C. Block 404: The nested rules are converted into minterms. After the conversion, the policy is represented as below:

| Nested Rule | Minterm | Action |
|---|---|---|
| $R_{n1}$ | $M_1 = (R_{u1}\ \&\ R_{h1})$ | Forward 1 |
| $R_{n2}$ | $M_2 = (R_{u2}\ \&\ R_{c1})$ | Forward 2 |
| $R_{n3}$ | $M_3 = (R_{u3}\ \&\ R_{c2})$ | Forward 3 |
| $R_{n3}$ | $M_4 = (R_{h2}\ \&\ R_{c2})$ | Forward 3 |

D. Block 406: The total number minterms in this example is 4, and hence the bit mask length is 4 bit positions. The following tables explain the creation of bit masks.

| | Minterm | Bit Value | Explanation |
|---|---|---|---|
| $R_{u1}$ Mask Bit Index | | | |
| 1 | $M_1 = (R_{u1}\ \&\ R_{h1})$ | 1 | $R_{u1}$ is present in minterm |
| 2 | $M_2 = (R_{u2}\ \&\ R_{c1})$ | 0 | $R_{u1}$ is not present in minterm |
| 3 | $M_3 = (R_{u3}\ \&\ R_{c2})$ | 0 | $R_{u1}$ is not present in minterm |
| 4 | $M_4 = (R_{h2}\ \&\ R_{c2})$ | 1 | No rule from URL database |
| $R_{u2}$ Mask Bit Index | | | |
| 1 | $M_1 = (R_{u1}\ \&\ R_{h1})$ | 0 | $R_{u2}$ is not present in minterm |
| 2 | $M_2 = (R_{u2}\ \&\ R_{c1})$ | 1 | $R_{u2}$ is present in minterm |
| 3 | $M_3 = (R_{u3}\ \&\ R_{c2})$ | 0 | $R_{u2}$ is not present in minterm |
| 4 | $M_4 = (R_{h2}\ \&\ R_{c2})$ | 1 | No rule from URL database |
| $R_{u3}$ Mask Bit Index | | | |
| 1 | $M_1 = (R_{u1}\ \&\ R_{h1})$ | 0 | $R_{u3}$ is not present in minterm |
| 2 | $M_2 = (R_{u2}\ \&\ R_{c1})$ | 0 | $R_{u3}$ is not present in minterm |
| 3 | $M_3 = (R_{u3}\ \&\ R_{c2})$ | 1 | $R_{u3}$ is present in minterm |
| 4 | $M_4 = (R_{h2}\ \&\ R_{c2})$ | 1 | No rule from URL database |
| $R_{u3}$ Mask Bit Index | | | |
| 1 | $M_1 = (R_{u1}\ \&\ R_{h1})$ | 1 | $R_{h1}$ is present in minterm |
| 2 | $M_2 = (R_{u2}\ \&\ R_{c1})$ | 1 | No rule from host database |
| 3 | $M_3 = (R_{u3}\ \&\ R_{c2})$ | 1 | No rule from host database |
| 4 | $M_4 = (R_{h2}\ \&\ R_{c2})$ | 0 | $R_{h1}$ is not present in minterm |
| $R_{h2}$ Mask Bit Index | | | |
| 1 | $M_1 = (R_{u1}\ \&\ R_{h1})$ | 0 | $R_{h2}$ is not present in minterm |
| 2 | $M_2 = (R_{u2}\ \&\ R_{c1})$ | 1 | No rule from host database |
| 3 | $M_3 = (R_{u3}\ \&\ R_{c2})$ | 1 | No rule from host database |
| 4 | $M_4 = (R_{h2}\ \&\ R_{c2})$ | 1 | $R_{h2}$ is present in minterm |
| $R_{c1}$ Mask Bit Index | | | |
| 1 | $M_1 = (R_{u1}\ \&\ R_{h1})$ | 1 | No rule from cookie database |
| 2 | $M_2 = (R_{u2}\ \&\ R_{c1})$ | 1 | $R_{c1}$ is present in minterm |
| 3 | $M_3 = (R_{u3}\ \&\ R_{c2})$ | 0 | $R_{c1}$ is not present in minterm |
| 4 | $M_4 = (R_{h2}\ \&\ R_{c2})$ | 0 | $R_{c1}$ is not present in minterm |
| $R_{c2}$ Mask Bit Index | | | |
| 1 | $M_1 = (R_{u1}\ \&\ R_{h1})$ | 1 | No rule from cookie database |
| 2 | $M_2 = (R_{u2}\ \&\ R_{c1})$ | 1 | $R_{c2}$ is not present in minterm |
| 3 | $M_3 = (R_{u3}\ \&\ R_{c2})$ | 0 | $R_{c2}$ is present in minterm |
| 4 | $M_4 = (R_{h2}\ \&\ R_{c2})$ | 0 | $R_{c2}$ is present in minterm |

$R_{u1}$ bit mask = 1001
$R_{u2}$ bit mask = 1010
$R_{u3}$ bit mask = 1100
$R_{h1}$ bit mask = 0111
$R_{h2}$ bit mask = 1110
$R_{c1}$ bit mask = 0011
$R_{c2}$ bit mask = 1101

E. Blocks 408-414: The following pseudo code for the overall search scheme represents the manner in which each database is searched for a simple rule that matches contents of the HTTP header, and then an AND operation is applied to the bit masks of these matching simple rules to obtain a new bit mask, the first bit position index of which corresponds to a valid matching nested rule from the minterm table of section C above.

```
for(i=0; i<num_of_databases; ++i)
{
rule=search_each_database(i);
new_mask &=rule->mask;
}
```

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

For example, embodiments have been described herein in terms of making load balancing decisions on the basis of HTTP header content. It is appreciated that one embodiment of the invention can also be used to make load balancing decisions on the basis of other header content. With regards to this other header content, logical rules similar to those described herein can be created, and then such rules can be evaluated using the techniques described herein. Accordingly, it is understood that the invention is not necessarily limited to use solely with HTTP header content.

Moreover, several example formats and syntax for rules, policies, software commands, and the like have been provided herein. It is appreciated that these examples are merely for purposes of explanation and illustration. Other embodiments can use different formats and syntax.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    defining a plurality of first rules made up of relatively less complex second rules;
    defining a policy having at least some of the plurality of first rules and defining corresponding actions to undertake that are related to communication of a packet within a network;
    converting the first rules into minterm representations;
    generating a bit mask for each of the second rules based on their presence in the minterm representations;
    using the generated bit masks and content in a header of the packet to evaluate the plurality of first rules in the policy and to determine a corresponding action to undertake.

2. The method of claim 1 wherein using the content in the header of the packet to evaluate the plurality of first rules includes using content in fields of a hypertext transfer protocol (HTTP) header of the packet.

3. The method of claim 2 wherein using content in the fields of the HTTP header of the packet includes using content from at least one of header value, header name, universal resource locator string, method, hostname, cookie, defined, and undefined fields of the HTTP header.

4. The method of claim 1 wherein defining the plurality of first rules made up of relatively less complex second rules includes defining the first rules by nesting the second rules using logical operators.

5. The method of claim 1 wherein defining the corresponding actions to undertake that are related to communication of the packet within the network includes at least one of defining forward, redirect, persist, reply error, and reset client actions for each set of matching first rules in the policy.

6. The method of claim 1 wherein converting the first rules into minterm representations includes converting the first rules into minterms that are products of the second rules, said products being summed together, and storing the minterms in a minterm data structure.

7. The method of claim 6, further comprising placing all second rules of a similar type in same rule type data structures, wherein generating the bit mask for each of the second rules based on their presence in the minterm representations includes:
determining a total number of minterms in the policy and using the determined total number of minterms to define a number of bit positions for the bit mask; and
for each of the second rules:
determining whether a particular second rule is present in each successive minterm in the minterm data structure, and enabling a bit position of the bit mask that corresponds to each minterm in which that particular second rule is present;
disabling a bit position of the bit mask that corresponds to each minterm in which that particular second rule is not present; and
enabling a bit position of the bit mask that corresponds to each minterm in which that particular second rule is not present but includes second rules from a different rule type data structure.

8. The method of claim 7 wherein using the generated bit masks and content in the header of the packet to evaluate the plurality of first rules in the policy and to determine the corresponding action to undertake includes:
searching for a second rule in each rule type data structure that corresponds to content in the packet;
for second rules located by the searching, obtaining the corresponding generated bit masks;
applying a logical operation to the obtained bit masks to generate a new bit mask;
locating a first non-zero value in a bit position of the new bit mask, and designating a first rule associated with a minterm corresponding to that bit position as a match for said corresponding action to undertake.

9. The method of claim 8 wherein the logical operation includes an AND operation.

10. A method, comprising:
storing a plurality of complex rules made up of simpler rules and being indicative of actions to take relative to processing of a packet communicated within a network;
storing minterm representations obtained from the complex rules;
storing a bit mask generated for each simpler rule based on the minterm representations of the complex rules;
examining header content of the packet; and
using the header content of the packet and the bit masks to evaluate the complex rules represented as minterms, and determining which action to undertake relative to that packet in accordance with results of the evaluation.

11. The method of claim 10 wherein using the header content of the packet and the bit masks to evaluate the complex rules represented as minterms includes:
determining which simpler rules correspond to the header content;
determining the bit masks for these determined simpler rules;
performing a logical operation on these determined bit masks to generate a new bit mask; and
determining a complex rule that matches the header content from a minterm identifiable from the new bit mask.

12. The method of claim 10 wherein the bit mask generated for each simpler rule includes bit position values in the bit mask based on whether a particular simpler rule is present in a minterm.

13. The method of claim 10, further comprising:
storing simpler rules of similar rule type in a common data structure; and
searching each data structure for a specific simpler rule that corresponds to the header content.

14. The method of claim 10 wherein the plurality of complex rules made up of simpler rules includes a plurality of logical operators to relate a plurality of simpler rules to form at least one complex rule.

15. A method, comprising:
storing at least one minterm obtained from a first rule and made of a plurality of second rules that are less complex relative to the first rule;
storing a bit mask for each of the second rules;
for data from any field in a header of a packet, determining which second rules correspond to that data;
applying a logical operation to stored the bit masks of the second rules corresponding to the data to obtain a new bit mask; and
determining an action to undertake related to the packet from a minterm validated via the new bit mask.

16. The method of claim 15 wherein applying the logical operation to the bit masks of the second rules to obtain the new bit mask includes applying an AND operation to these bit masks, and wherein determining the action to undertake from the minterm validated via the new bit mask includes identifying the minterm from a first non-zero bit position in the new bit mask.

17. The method of claim 15 wherein the bit mask for each of the second rules includes bit position values of the bit mask based on whether a particular second rule is present in a given minterm.

18. The method of claim 15, further comprising:
examining data in fields of the header in addition to hostname, URL, and cookie fields; and
searching for second rules corresponding to this data in separate data structures organized according to rule types.

19. An article of manufacture, comprising:
a machine-readable storage medium having instructions stored thereon and executable by a processor to:
define a plurality of first rules made up of relatively less complex second rules;
define a policy having at least some of the plurality of first rules and define corresponding actions to undertake that are related to communication of a packet within a network;
convert the first rules into minterm representations;

generate a bit mask for each of the second rules based on their presence in the minterm representations;

use the generated bit masks and content in a header of the packet to evaluate the plurality of first rules in the policy and to determine a corresponding action to undertake.

20. The article of manufacture of claim 19 wherein the instructions to convert the first rules into minterm representations includes instructions to convert the first rules into minterms that are products of the second rules, said products being summed together, and to store the minterms in a minterm data structure, wherein the machine-readable medium includes instructions stored thereon to locate all second rules of a similar type in same rule type data structures, wherein the instructions to generate the bit mask for each of the second rules based on their presence in the minterm representations includes instructions to:

determine a total number of minterms in the policy and use the determined total number of minterms to define a number of bit positions for the bit mask; and for each of the second rules:
  determine whether a particular second rule is present in each successive minterm in the minterm data structure, and enable a bit position of the bit mask that corresponds to each minterm where in which that particular second rule is present;
  disable a bit position of the bit mask that corresponds to each minterm in which that particular second rule is not present; and
  enable in a bit position of the bit mask that corresponds to each minterm in which that particular second rule is not present but includes second rules from a different rule type data structure.

21. The article of manufacture of claim 20 wherein the instructions to use the generated bit masks and content in the header of the packet to evaluate the plurality of first rules in the policy and to determine the corresponding action to undertake includes instructions to:

search for a second rule in each rule type data structure that corresponds to content in the packet;

for second rules located by the searching, obtain the corresponding generated bit masks;

apply a logical operation to the obtained bit masks to generate a new bit mask;

locate a first enabled bit position of the new bit mask, and designate a first rule associated with a minterm corresponding to that bit position as a match for said action to undertake.

22. A system, comprising:
a means for defining a plurality of complex rules made up of simpler rules and being indicative of actions to take relative to processing of a packet communicated within a network;
a means for converting the complex rules into minterm representations;
a means for generating a bit mask for each simpler rule based on the minterm representations of the complex rules;
a means for examining header content of the packet; and
a means for using the header content of the packet and the bit masks to evaluate the complex rules represented as minterms, and for determining which action to undertake relative to that packet in accordance with results of the evaluation.

23. The system of claim 22 wherein the means for using the header content of the packet and the bit masks to evaluate the complex rules represented as minterms includes:
  a means for determining which simpler rules correspond to the header content;
  a means for determining the bit masks for these simpler rules;
  a means for performing a logical operation on these bit masks to generate a new bit mask; and
  a means for determining a complex rule that matches the header content from a minterm identifiable from the new bit mask.

24. The system of claim 22 wherein the means for generating the bit mask for each simpler rule includes a means for generating bit position values in the bit mask based on whether a particular simpler rule is present in a minterm, the apparatus further comprising:
  a means for placing simpler rules of similar rule type in a common data structure; and
  a means for searching each data structure for a specific rule that corresponds to the header content.

25. The system of claim 22, further comprising a means for communicating between a client device and a network component.

26. An apparatus, comprising:
a data structure having a first rule reduced into at least one minterm made of a plurality of second rules, and having a bit mask generated for each of the second rules;
a first component having access to the data structure to determine which second rules correspond to data from any field in a header of a packet;
a second component to apply a logical operation to the bit masks of the second rules determined by the first component to correspond to the data, and to obtain a new bit mask as a result of application of the logical operation; and
a third component having access to the data structure to determine an action to undertake related to the packet from a minterm validated via the new bit mask.

27. The apparatus of claim 26 wherein at least one of the data structure, first component, second component, and third component are located in a switch that can receive the packet.

28. The apparatus of claim 26 wherein the data structure includes a plurality of rule type data structures that correspondingly store second rules of similar rule types.

29. The apparatus of claim 26 wherein the header comprises an HTTP header of the packet.

30. The apparatus of claim 26 wherein to define the first rule, the second rules are related using a plurality of logical operators.

31. The method of claim 10 wherein said minterm representations are stored in a minterm data structure, the method further comprising:
storing all simpler rules of a similar type in same rule type data structures,
wherein the bit mask generated for each simpler rule includes:
  a) a number of bit positions determined according to a total number of minterm representations in said minterm data structure; and
  b) enabled and disabled bit positions based on: whether the simpler rule corresponding to the bit mask is present in a minterm representation respectively associated with each bit position, and whether the simpler rule corresponding to the bit mask is not present in the minterm representation respectively associated with each bit position and other simpler rules present in said minterm representation are stored in a different rule type data structure.

32. The method of claim 15 wherein storing said at least one minterm includes storing a plurality of minterms in a minterm data structure, the method further comprising:
storing all second rules of a similar type in same rule type data structures,
wherein the bit mask for each second rule includes:
a) a number of bit positions determined according to a total number of minterms in said minterm data structure; and
b) enabled and disabled bit positions based on: whether the second rule corresponding to the bit mask is present in a minterm respectively associated with each bit position, and whether the second rule corresponding to the bit mask is not present in the minterm respectively associated with each bit position and other second rules present in said minterm are present in a different rule type data structure.

33. The system of claim 22, further comprising:
minterm data structure means for storing said minterm representations; and
multiple rule type data structure means for respectively storing all simpler rules of a similar rule type,
wherein said means for generating the bit mask for each simpler rule includes:
a) means for determining a total number of minterm representations in said minterm data structure means and for using the determined total number of minterm representations to define a number of bit positions for the bit mask; and
b) for each of the simpler rules:
means for determining whether a particular simpler rule is present in each successive minterm representation in the minterm data structure means, and for enabling a bit position of the bit mask that corresponds to each minterm representation in which that particular simpler rule is present;
means for disabling a bit position of the bit mask that corresponds to each minterm representation in which that particular simpler rule is not present; and
means for enabling in a bit position of the bit mask that corresponds to each minterm representation in which that particular simpler rule is not present but includes at least one simpler rule of a different rule type.

34. The apparatus of claim 26 wherein said data structure is adapted to separately store together all second rules of a similar rule type, and
wherein the bit mask for each of the second rules includes:
a) a number of bit positions determined according to a total number of minterms in said data structure; and
b) enabled and disabled bit positions based on: whether the second rule corresponding to the bit mask is present in a minterm respectively associated with each bit position, and whether the second rule corresponding to the bit mask is not present in the minterm respectively associated with each bit position and other second rules of a different rule type are present in said minterm.

35. An apparatus, comprising:
at least one storage medium configured to store:
a minterm table having a plurality of minterms each associated with one of a plurality of first rules that are each defined according to a logical relationship of second rules, each minterm including products of said second rules said first rules, each of said first rules specifying a routing action to apply to a packet;
a plurality of bit masks respectively corresponding to each of said second rules; and
a processor coupled to said at least one storage medium and adapted to: identify matching ones of said second rules that match header content of said packet, to perform a logical operation between bit masks corresponding to said matching second rules to obtain a new bit mask, to use an enabled bit position in said new bit mask to identify from said minterm table a valid one of said first rules, and to apply the routing action specified by said identified valid first rule to said packet.

36. The apparatus of claim 35 wherein said at least one storage medium is further configured to store different types of said second rules in separate data structures so that similar types of said second rules are stored in same data structures.

37. The apparatus of claim 35 wherein each of said bit masks has a number of bit positions corresponding to a number of minterms in said minterm table, each bit position being associated with a respective minterm in said minterm table, wherein a value of each bit position of each bit mask is based at least in part on whether the second rule corresponding the bit mask is present in the respective minterm associated with each bit position.

38. The apparatus of claim 37 wherein a value of a bit position is binary 1 if said corresponding second rule is present in the respective minterm associated with that bit position, binary 0 if said corresponding second rule is not present in the respective minterm associated with that bit position, and is binary 1 if said corresponding second rule is not present in the respective minterm associated with that bit position and if said respective minterm associated with that bit position includes second rules that are of a different type than said corresponding second rule.

39. The apparatus of claim 35 wherein said enabled bit position, in said new bit mask used by said processor identify said valid first rule, is first bit position in said new bit mask having a non-zero value, said bit position having said non-zero value being usable by said processor as an index to said minterm table to identify said valid first rule.

40. The apparatus of claim 35 wherein to perform said logical operation between said bit masks corresponding to said matching second rules, said processor is adapted to perform a logical AND operation between values of corresponding bit positions in said bit masks.

* * * * *